(12) United States Patent
Kanao et al.

(10) Patent No.: US 9,509,145 B2
(45) Date of Patent: Nov. 29, 2016

(54) DISTRIBUTED POWER SUPPLY SYSTEM

(75) Inventors: Norikazu Kanao, Toyama (JP);
Kansuke Fujii, Kanagawa (JP);
Toshiya Yamada, Kanagawa (JP);
Motohiro Katayama, Kanagawa (JP)

(73) Assignees: HOKURIKU ELECTRIC POWER COMPANY, Toyama (JP); FUJI ELECTRIC CO., LTD., Kanagawa (JP)

( * ) Notice: Subject to any disclaimer, the term of this patent is extended or adjusted under 35 U.S.C. 154(b) by 676 days.

(21) Appl. No.: 14/000,720

(22) PCT Filed: Feb. 3, 2012

(86) PCT No.: PCT/JP2012/052513
§ 371 (c)(1),
(2), (4) Date: Aug. 21, 2013

(87) PCT Pub. No.: WO2012/127910
PCT Pub. Date: Sep. 27, 2012

(65) Prior Publication Data
US 2013/0328398 A1 Dec. 12, 2013

(30) Foreign Application Priority Data

Mar. 23, 2011 (JP) .................................. 2011-065002

(51) Int. Cl.
*H02J 1/10* (2006.01)
*H02J 3/38* (2006.01)
(Continued)

(52) U.S. Cl.
CPC ................ *H02J 4/00* (2013.01); *H02J 3/1814* (2013.01); *H02M 7/53875* (2013.01); *Y02E 40/18* (2013.01); *Y10T 307/344* (2015.04)

(58) Field of Classification Search
CPC ...... H02J 3/1814; H02J 4/00; Y10T 307/344
USPC ...................... 307/22, 23, 26; 363/40, 41, 43
See application file for complete search history.

(56) References Cited

U.S. PATENT DOCUMENTS 6,304,468 B2 * 10/2001 Ichinose .......................... 307/87
2007/0103004 A1 * 5/2007 Chou ........................ H02J 3/38
307/64

(Continued)

FOREIGN PATENT DOCUMENTS

JP 7-213069 8/1995
JP 07213069 A * 8/1995

(Continued)

OTHER PUBLICATIONS

International Search Report for PCT/JP2012/052513 mailed Apr. 24, 2012.

(Continued)

*Primary Examiner* — Rexford Barnie
*Assistant Examiner* — Rasem Mourad
(74) *Attorney, Agent, or Firm* — Young & Thompson

(57) ABSTRACT

The disclosed distributed power supply system does not become disconnected from a grid simultaneously with others when the grid voltage falls instantaneously. In a distributed power supply device which controls an inverter circuit 10 based on a control signal obtained by comparing a predetermined carrier signal and voltage command signals of three phases and which converts DC power to AC power and supplies the AC power to a power grid of a three-phase AC power supply, fundamental wave signals of three phases are generated from a grid voltage of the three-phase AC power supply. A reference cosine wave signal is generated from the fundamental wave signals of three phases. A third harmonic signal is generated from the reference cosine wave signal and the fundamental wave signals of three phases. The three-phase fundamental wave signals and the third harmonic signal are added to generate voltage command signals of three phases.

3 Claims, 6 Drawing Sheets

(51) Int. Cl.
*H02J 9/00* (2006.01)
*H02J 4/00* (2006.01)
*H02J 3/18* (2006.01)
*H02M 7/5387* (2007.01)

(56) References Cited

U.S. PATENT DOCUMENTS

2011/0063883 A1* 3/2011 Hattori .............. H02M 7/53873
363/148
2012/0262957 A1* 10/2012 Yamada .................... H02J 3/01
363/41

FOREIGN PATENT DOCUMENTS

| JP | 2003-134843 | | 5/2003 |
|---|---|---|---|
| JP | 2003134843 A | * | 5/2003 |
| JP | 2004-153957 | | 5/2004 |
| JP | 2010161901 | | 7/2010 |

OTHER PUBLICATIONS

K. Fujii et al., Self-commutated Flicker Compensator applying Flat-packaged IGBT, The Institute of Electrical Engineers of Japan, Static Apparatus Research Group (Oct. 23, 2001), Reference No. SA-01-39, pp. 1-6.

\* cited by examiner

US 9,509,145 B2

DISTRIBUTED POWER SUPPLY SYSTEM

TECHNICAL FIELD

The present invention relates to a distributed power supply system such as a photovoltaic generation system or wind power generation system which supplies power in coordination with a power grid.

BACKGROUND ART

Conventionally, a distributed power supply system such as a solar power generation system or wind power generation system which converts DC power generated using solar rays, wind or the like as an energy source to AC power and supplies power in coordination with a power grid is developed.

FIG. 6 is a block diagram for explaining such a distributed power supply system. Each grid generating line and signal line is usually described as two to three (or four) lines, forming a two-phase or three-phase circuit. However, here, each line is represented by a single line for simplification.

In FIG. 6, 1 is a three-phase AC power supply which supplies power to a power system. 2 to 4 are switches. 10 is an inverter circuit for grid connection. 11 is a DC power supply such as a solar cell. 100 is a control circuit which controls the inverter circuit 10. 5 is a load supplied from the power grid of the three-phase AC power supply 1. 6 is a voltage detector which detects the grid voltage of the three-phase AC power supply 1. 7 is a current detector which detects the output current of the inverter circuit 10. 8 is a capacitor. 9 is a reactor.

The inverter circuit 10 is a circuit having semiconductor switching elements connected in a three-phase bridge configuration. The on/off state of the semiconductor switching elements connected in the bridge configuration is controlled, based on a pulse width modulated (PWM) control signal outputted from the control circuit 100. Consequently, AC voltages of three phases are generated at an output end of the inverter circuit 10. This three-phase AC voltage is a voltage made up of a pulse string obtained by PWM of a DC voltage output from the DC power supply 11. An LC filter formed by the reactor 9 and the capacitor 8 eliminates a harmonic component from the three-phase AC voltage made up of a pulse string and thereby converts the three-phase AC voltage to a sine wave voltage. The sine-wave three-phase AC voltage from which the harmonic component is eliminated is outputted to the power grid of the three-phase AC power supply 1.

The control circuit 100 has PLL (phase-locked loop) calculation means 12, three-phase voltage command signal generation means 13, coordinate conversion means 14, output current control means 15, and a gate signal generation circuit 16.

The PLL calculation means 12 has a function of generating an angular frequency ωo coinciding with the phase of grid voltage detected by the voltage detector 6. Specific operations of the PLL calculation means 12 will be described later.

The three-phase voltage command signal generation means 13 generates voltage command signals Vuref, Vvref, Vwref of three phases having a predetermined amplitude, based on the angular frequency ωo generated by the PLL calculation means 12.

The coordinate conversion means 14 performs coordinate conversion of an active current command Idref and a reactive current command Iqref, using the angular frequency ωo generated by the PLL calculation means 12, and thus generates a U-phase output current command Iuref and a W-phase output current command Iwref.

The output current control means 15 carries out Alternate Current Regulation (ACR) control so that the U-phase and W-phase output current commands Iuref, Iwref generated by the coordinate conversion means 14 coincide with output currents Iu, Iw of the inverter circuit 10 detected by the current detector 7. As a result of the ACR control, the output current control means 15 generates correction signals ΔVuref, ΔVvref, ΔVwref for correcting the voltage command signals Vuref, Vvref, Vwref of each phase.

The gate signal generation circuit 16 adds, by each phase, the voltage command signals Vuref, Vvref, Vwref of each phase and the correction signals ΔVuref, ΔVvref, ΔVwref for the voltage commands of each phase, and thus generates modulation signals of each phase. Next, the gate signal generation circuit 16 compares the size of the modulation signals of each phased with a predetermined carrier signal and generates PWM control signals G1 to G6. The control signals G1 to G6 are output to the inverter circuit 10.

The semiconductor switching elements of the inverter circuit 10 are controlled in the on/off state thereof, based on the control signals G1 to G6 generated by the gate signal generation circuit 16. Consequently, AC voltages of three phases are generated at the output end of the inverter circuit 10.

An output voltage control method for an inverter circuit connected to a power grid in this manner is disclosed, for example, in NPL 1.

By the way, such a distributed power supply system is required to stably supply power to a power grid. Therefore, the control circuit 100 controls the frequency and phase of a voltage is output from the inverter circuit 10, based on the phase and frequency of grid voltage. To realize such control, the control circuit 100 of the distributed power supply system shown in FIG. 6 has the PLL calculation means 12.

As an example of the PLL calculation means 12 shown in FIG. 6, FIG. 7 shows a block diagram of the PLL calculation means disclosed in PTL 1.

The PLL calculation means 12 has αβ conversion means 121, dq conversion means 122, proportional-integral control means 123, and VCO (voltage controlled oscillator) means 124. In the following description, the proportional-integral control means 123 is also referred to as PI control means 123.

The αβ conversion means 121 is to convert voltage signals Vu, Vv, Vw of three phases detected by the voltage detector 6 to voltage signals Vα, Vβ of two phases. To the dq conversion means 122, the voltage signals Vα, Vβ are input from the αβ conversion means 121 and a phase signal θ is input from the VCO means 124. The dq conversion means 122 calculates a phase difference component Vq and an in-phase component Vd from the phase signal θ and the voltage signals Vα, Vβ. The PI control means 123 carries out arithmetic control with a proportional-integral controller (PI controller) so that the phase difference component Vq reaches zero and outputs a correction value. A correction angular frequency ωo, obtained by adding this correction value to a target angular frequency ωs* of a grid voltage signal by an adder 126, is outputted to the VCO means 124. The VCO means 124 outputs a phase signal θ corresponding to the input correction angular frequency ωo to the dq conversion means 122.

By this feedback control, the phase is locked when the phase difference component Vd reaches zero. At this point, the phase signal θ coincides with the phase of grid voltage.

Therefore, the correction angular frequency ωo is output from the PLL calculation means 12 coincides with the angular frequency of grid voltage.

CITATION LIST

Patent Literature

PTL 1: JP-A-2010-161901

Non-Patent Literature

NPL 1: The Institute of Electrical Engineers of Japan, Static Apparatus Research Group (Oct. 23, 2001), Reference Number SA-01-39

SUMMARY OF INVENTION

Technical Problem

By the way, the grid interconnection code (JEAC 9701-2006) issued by the grid interconnection expert group of the Japan Electric Association requires a distributed power supply system to stop temporarily when an abnormality occurs in the power grid, and then restart. Therefore, a distributed power supply system has a protection function which detects an abnormality in the power grid. Thus, if an abnormality such as an instantaneous voltage sag occurs in the power grid, there is a possibility that a number of distributed power supply systems connected to the same power grid are disconnected simultaneously from the power grid. In this case, there is a concern that a fall in grid frequency and a fluctuation in grid voltage are caused. Therefore, it is desired that a distributed power supply system continues operating stably even if an instantaneous voltage sag for a shorter time than an abnormality in the power grid defined by the grid interconnection code occurs.

However, the PLL calculation means 12 provided in the distributed power supply system shown in FIG. 6 has the PI control means 123. The PI control means 123 carries out a proportional operation and an integral operation based on the amount of deviation (=0−Vq) of the phase difference component Vq in relation to the command value 0, and thus functions so that the deviation of an input signal becomes zero in relation to the command value.

That is, the PI control means 123 has an integrating function and therefore cannot instantly cause an output signal to follow a sudden change of an input voltage. Therefore, it is known that if the grid voltage instantaneously sags due to the occurrence of a short circuit between phases in the power grid, a large phase difference is generated for a short time between the grid voltage and the voltage is output from the inverter circuit 10. Consequently, an overcurrent due to this phase difference is generated between the power grid and the inverter circuit 10. Since the distributed power supply system where the overcurrent is generated stops operating, there is a problem that the system is detached from the power grid and cannot supply power.

In order to solve the problems as described above, it is an object of the invention to provide a distributed power supply system which can stably supply power to a power grid even when an instantaneous voltage sags in the power grid.

Solution to Problem

To achieve the above object, a distributed power supply system provided by the invention includes an inverter circuit having semiconductor switching elements connected in a three-phase bridge, and a control circuit which compares a predetermined carrier signal with voltage command signals of three phases and generates a control signal to control the semiconductor switching elements. The distributed power supply system supplies AC power obtained by converting DC power to a power grid of a three-phase AC power supply. The distributed power supply system has a voltage detector which detects a grid voltage of the three-phase AC power supply. The control circuit has: three-phase fundamental wave signal generation means which generates a first fundamental wave signal, a second fundamental wave signal, and a third fundamental wave signal from the grid voltage detected by the voltage detector; reference signal generation means which generates a first reference signal in phase with the first fundamental wave signal, based on the first to third fundamental wave signals, and generates a second reference signal having a phase difference of 90 degrees from the first reference signal; third harmonic signal generation means which generates a third harmonic signal, using a triple harmonic signal generated based on the first reference signal, and the first to third fundamental wave signals are output from the three-phase fundamental wave signal generation means; and three-phase voltage command signal generation means which adds each of the first to third fundamental wave signals and the third harmonic signal and thus generates voltage command signals of three phases.

According to the invention, the voltage command signals of three phases are trapezoidal wave signals obtained by adding the common third harmonic signals to the first to third fundamental wave signals. Therefore, compared with the case of a sine wave signal, the utilization rate of a voltage is output from a DC power supply can be improved. Also, even if an instantaneous voltage sags in the power grid, the distributed power supply system can control the output voltage while following the grid voltage. Thus, an overcurrent due to the phase difference between the grid voltage and the output voltage of the inverter circuit can be prevented.

According to a preferred embodiment of the invention, in the distributed power supply system having a filter circuit between the three-phase AC power supply and the inverter circuit, the three-phase fundamental wave signal generation means has fundamental wave component extraction means which extracts a fundamental wave component signal from the grid voltage detected by the voltage detector, and phase adjustment means which adds a predetermined phase value to the extracted fundamental wave component signal and thus generates the first to third fundamental wave signals. Moreover, in the system, the phase value added to the extracted fundamental wave component signal is an amount of phase difference generated between input and output voltages of the filter circuit.

According to this embodiment, even if the filter circuit exists between the distributed power supply system and the three-phase AC power supply, the voltage is output from the distributed power supply system is controlled in phase with the voltage phase of the three-phase AC power supply, at the output point of the filter circuit. Therefore, even if an instantaneous voltage sags in the power grid, the distributed power supply system can control the output voltage while following the grid voltage. Consequently, the generation of an overcurrent can be prevented.

According to a preferred embodiment of the invention, in the reference signal generation means has: first phase adjustment means which adjusts the phase of the second fundamental wave signal and thus generates a fourth fundamental wave signal; second phase adjustment means which adjusts the phase of the third fundamental wave signal and thus generates a fifth fundamental wave signal; reference voltage signal generation means which adds the first fundamental wave signal, the fourth fundamental wave signal, and the fifth fundamental wave signal and thus generates a reference voltage signal; first reference signal generation means which generates a first reference signal being in phase with the reference voltage signal and having an amplitude standardized to a predetermined value; and second reference signal generation means which generates a second reference signal having a phase difference of 90 degrees from the first reference signal.

According to this embodiment, since the first reference signal is generated based on all of the first to third fundamental wave signal, the control circuit can generate a signal to control the inverter circuit even if a short circuit is generated between any two phases in the power grid. Therefore, the distributed power supply system can continue operating.

ADVANTAGEOUS EFFECT OF INVENTION

According to the invention, a distributed power supply system which can stably supply power to a power grid even if an instantaneous voltage sags in the power grid can be provided.

DESCRIPTION OF EMBODIMENTS

Figure 4:
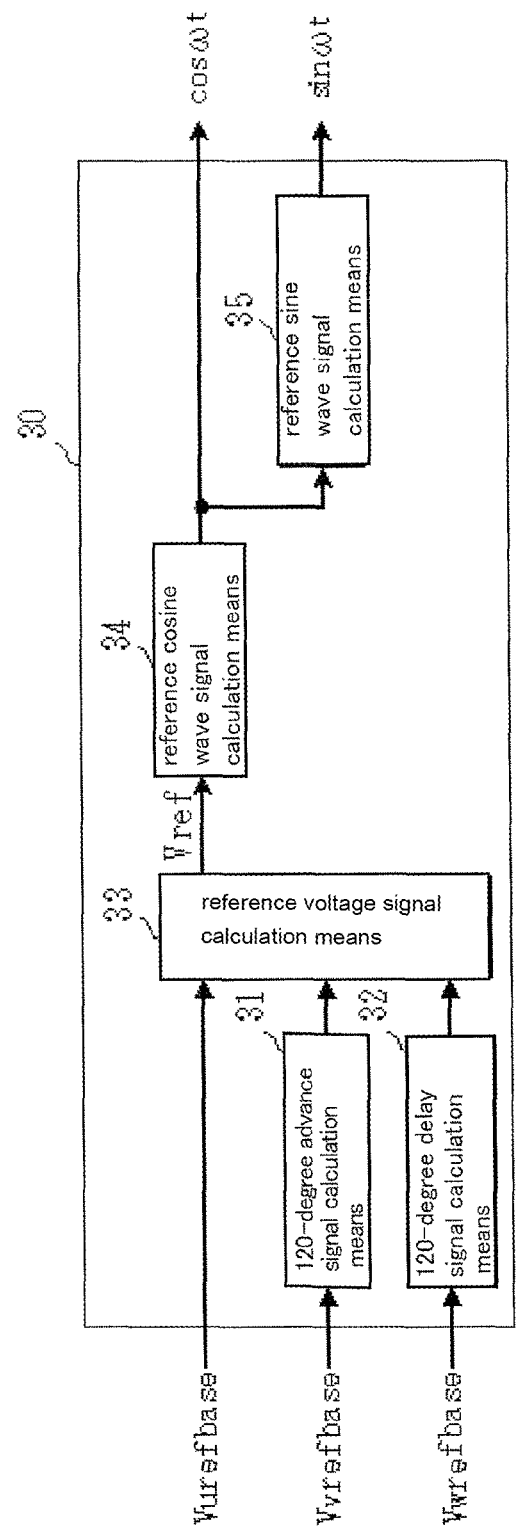
FIG. 4 is a block diagram showing an example of reference signal generation means.
Figure 5:
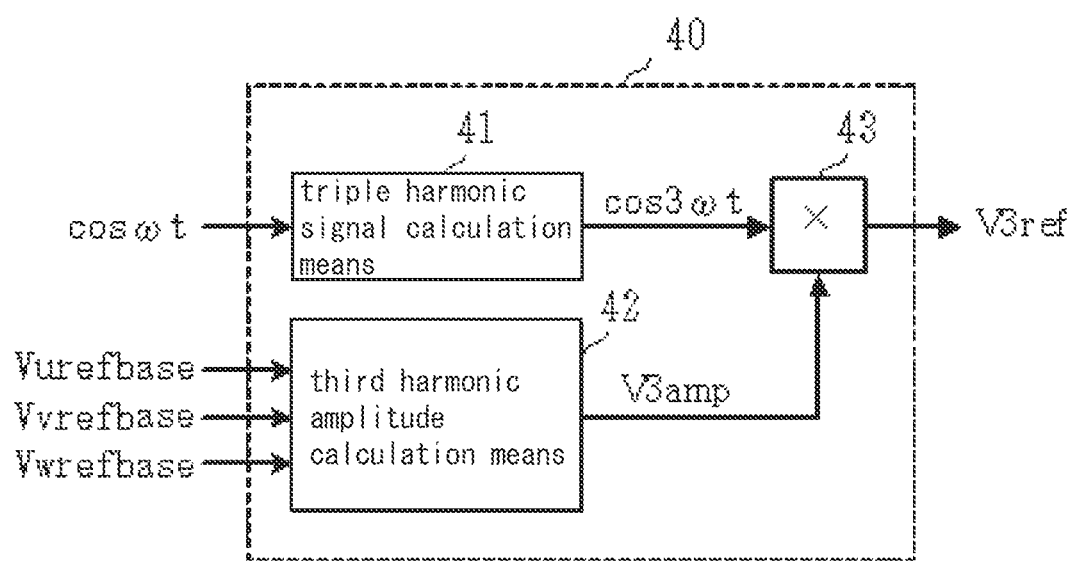
FIG. 5 is a block diagram showing an example of third harmonic signal generation means.
Figure 6:
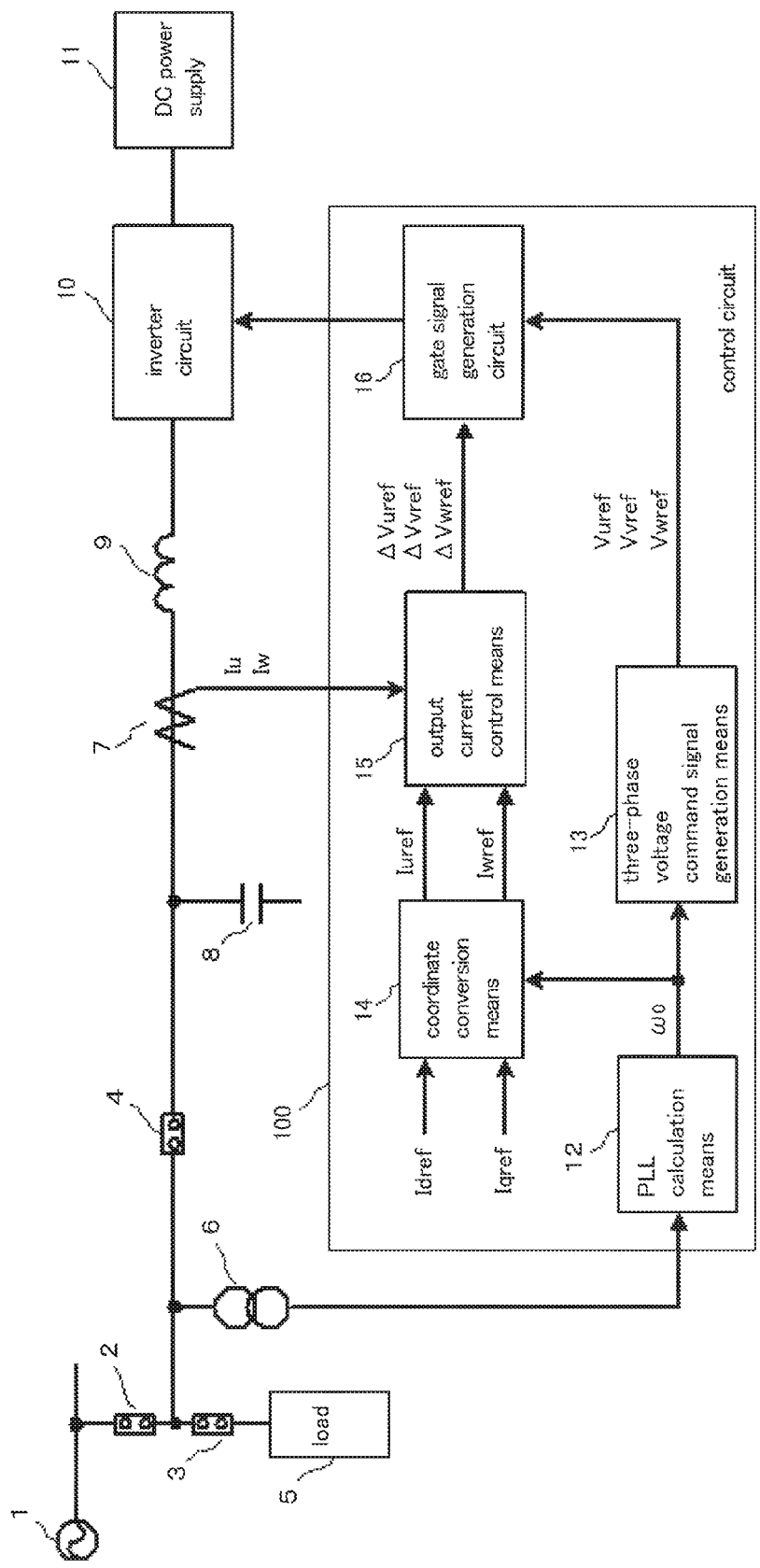
FIG. 6 is a block diagram for explaining an embodiment of a conventional distributed power supply system.
Figure 7:
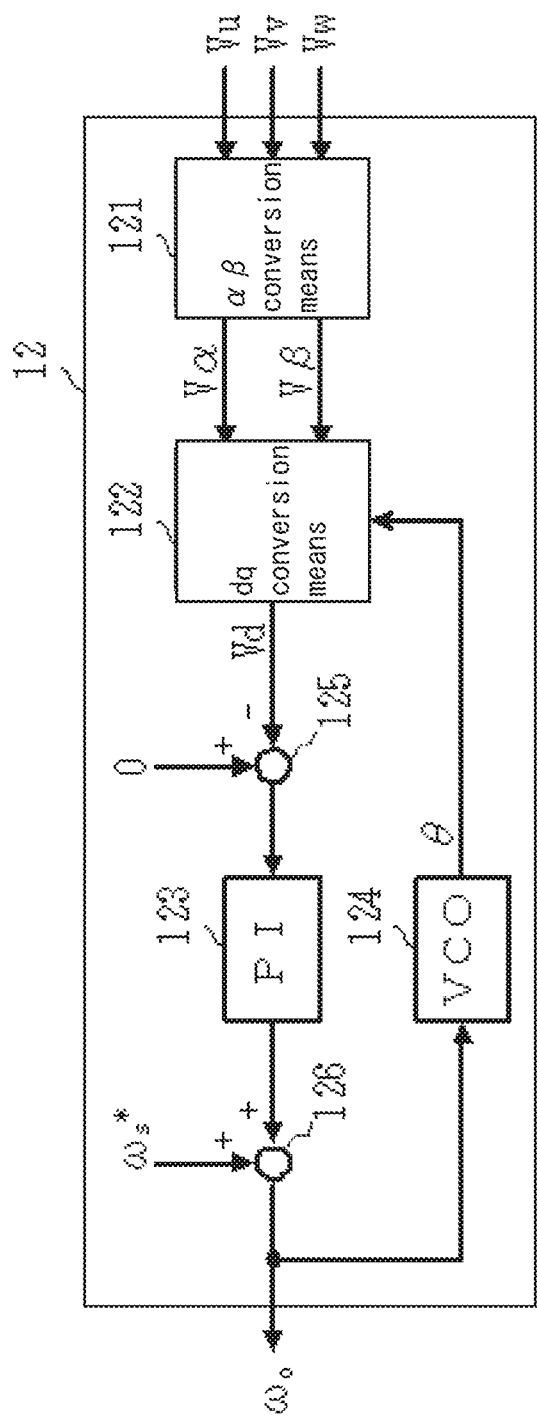
FIG. 7 is a block diagram showing an example of PLL control means.

Hereinafter, an embodiment of the invention will be described with reference to FIGS. 1 to 5. In FIGS. 1 to 5, components similar to the conventional distributed power supply system shown in FIG. 6 are denoted by the same reference numerals and description thereof is omitted.

Figure 1:
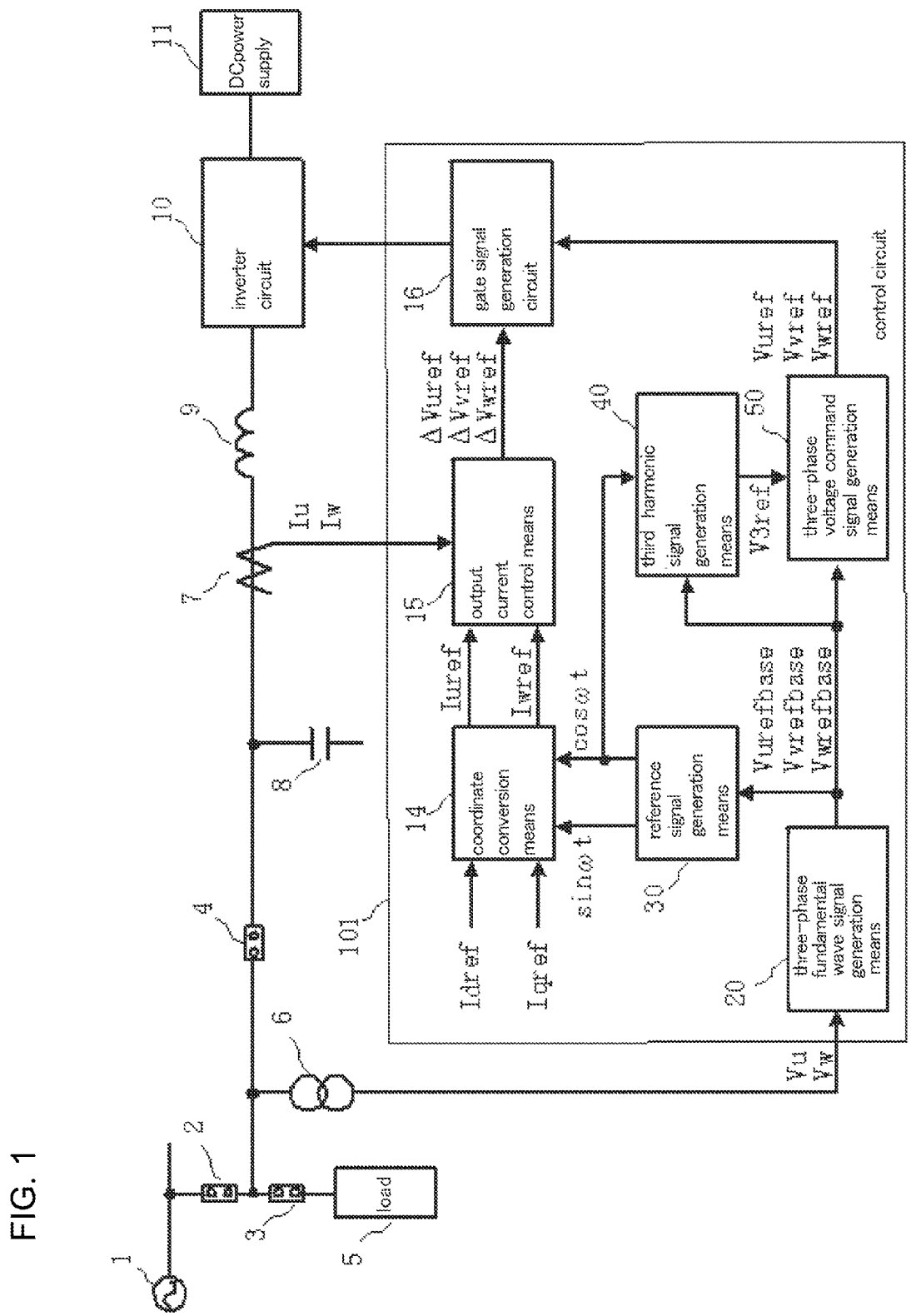
FIG. 1 is a block diagram for explaining an embodiment of a distributed power supply system according to the invention.

FIG. 1 is a block diagram for explaining an embodiment of a distributed power supply system according to the invention. In FIG. 1, components denoted by reference numerals 1 to 11 are the same as in the distributed power supply system of FIG. 6. Meanwhile, the distributed power supply system of FIG. 1 is different in that a control circuit 101 controls an inverter circuit 10.

The control circuit 101 has coordinate conversion means 14, output current control means 15, a gate signal generation circuit 16, three-phase fundamental wave signal generation means 20, reference signal generation means 30, third harmonic signal generation means 40, and three-phase voltage command signal generation means 50. Of the above components, the components denoted by the reference numerals 14 to 16 are the same components as in the control circuit 100.

Hereinafter, an operation of the distributed power supply system according to the invention will be explained while explaining the control circuit 101 having the above components.

The three-phase fundamental wave signal generation means 20 generates phase-adjusted three-phase fundamental wave signals Vurefbase, Vvrefbase, Vwrefbase, using a grid voltage of the three-phase AC power supply 1 detected by the voltage detector 6 as an input. Hereinafter, the fundamental wave signal Vurefbase is described as a first fundamental wave signal. The fundamental wave signal Vvrefbase is described as a second fundamental wave signal. The fundamental wave signal Vwrefbase is described as a third fundamental wave signal. However, whichever of the fundamental wave signals Vurefbase, Vvrefbase, Vwrefbase the first to third fundamental wave signals may be, the action of the control circuit 101 and the effect thereof are the same.

Figure 2:
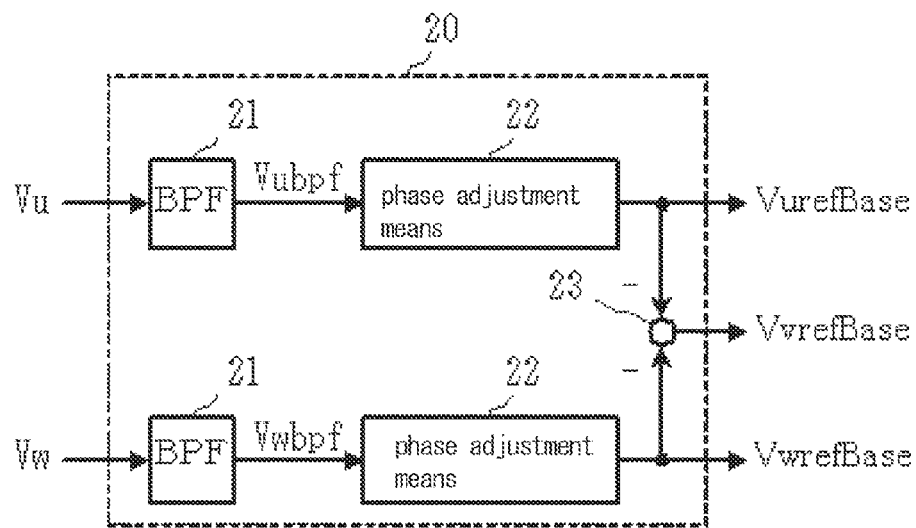
FIG. 2 is a block diagram showing an example of three-phase voltage command signal generation means.

FIG. 2 is a block diagram showing an example of the three-phase fundamental wave signal generation means 20. The three-phase fundamental wave signal generation means 20 has a band-pass filter 21, phase adjustment means 22, and an adder 23. In the following description, the band-pass filter 21 is also referred to as a BPF 21.

The BPF 21 is a filter (fundamental wave component extraction means) which passes only a frequency component in a predetermined frequency band, of frequency components included in an input signal. The frequency band passing through the BPF 21 is set to the frequency of the grid voltage. Thus, taking, as its input, U-phase and W-phase voltage signals Vu, Vw of the power grid detected by the voltage detector 6, the BPF 21 extracts and outputs fundamental wave component signals Vubpf, Vwbpf of those voltage signals.

The phase adjustment means 22 takes the signals Vubpf, Vwbpf from the BPF 21 as its input, and outputs signals VurefBase, VwrefBase in amplitude with those signals and having the phase adjusted by a predetermined amount in relation to those signals.

Figure 3:
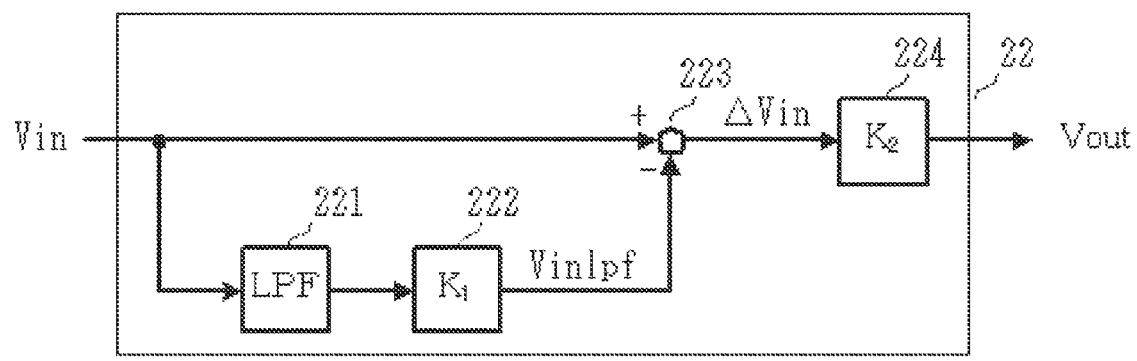
FIG. 3 is a block diagram showing an example of phase adjustment means.

FIG. 3 is a block diagram showing an example of the phase adjustment means 22. The phase adjustment means 22 has a low-pass filter 221, multipliers 222, 224, and an adder 223. The low-pass filter 221 is a filter that passes a frequency component in a lower frequency band than a cutoff frequency fc, of frequency components included in an input signal. In the following description, the low-pass filter 221 is also referred to as an LPF 221. Also, an input signal to the phase adjustment means 22 is expressed as Vin, and an output signal is expressed as Vout.

The phase adjustment means 22 uses the multiplier 222 to multiply a signal obtained by inputting an input signal Vin to the LPF 221, by a predetermined coefficient $K_1$, thus generating a signal Vinlpf. Next, a difference $\Delta Vin$ (=Vin−Vinlpf) between the input signal Vin and the signal Vinlpf obtained as a result of the above arithmetic operation is calculated by the adder 223. Moreover, the multiplier 224 is used to multiply the resulting signal $\Delta Vin$ by a predetermined coefficient $K_2$, thus generating an output signal Vout.

Here, the cycle T of the cutoff frequency fc of the LPF 221 is T=1/fc. Also, the angular frequency $\omega$ is $\omega = 2\pi fc$. In this case, the characteristics of the phase $\phi$ and gain $|g|$ of the output signal Vout in relation to the input signal Vin of the phase adjustment means 22 are expressed by the following equations (1) and (2).

[Math. 1]

$$\text{Phase}\phi = \tan^{-1}\frac{\omega T K_1}{1 - K_1 + (\omega T)^2}\text{[rad]} \quad (1)$$

$$\text{Gain}|g| = \frac{K_2}{1 + (\omega T)^2}\sqrt{\{1 - K_2 + (\omega T)^2\}^2 + (\omega T K_1)^2} \quad (2)$$

Based on the above equation (1), the phase φ of the output signal Vout in relation to the input signal Vin can be adjusted with the coefficient $K_1$. The amount of phase adjusted by the phase adjustment means 22 is equivalent to the phase difference generated between the phase of a voltage output from the inverter circuit 10 and a voltage output as this voltage passes an LC filter formed by the capacitor 8 and the reactor 9.

Also, based on the above equation (2), the gain |g| of the output signal Vout in relation to the input signal Vin can be adjusted with the coefficient $K_2$. The gain |g| is adjusted in such a manner that the ratio of the input signal Vin and the output signal Vout is 1:1 (gain |g|=1).

Back to FIG. 2, the three-phase fundamental wave signal generation means 20, using the BPF 21 and the phase adjustment means 22, generates phase-adjusted U-phase and W-phase fundamental wave signals Vurefbase, Vwrefbase from the U-phase and W-phase voltage signals Vu, Vw detected by the voltage detector 6. Moreover, by the adder 23, a V-phase fundamental wave signal Vvrefbase (=0−Vurefbase−Vwrefbase) is generated. The fundamental wave signals Vurefbase, Vvrefbase, Vwrefbase are outputted to the reference signal generation means 30 and the three-phase voltage command signal generation means 50.

Also, while the three-phase fundamental wave signal generation means 20 shown in FIG. 2 calculates fundamental wave signals of three phases from the U-phase and W-phase grid voltage, fundamental wave signals of three phases may also be calculated by a combination of other grid voltages. Also, each fundamental wave signal may be calculated from grid voltages of three phases.

The reference signal generation means 30 takes, as its input, the fundamental wave signals Vurefbase, Vvrefbase, Vwrefbase from the three-phase fundamental wave signal generation means 20, and generates a reference cosine wave signal cos ωt (first reference signal) and a reference sine wave signal sin ωt (second reference signal). FIG. 4 is a block diagram showing an example of the reference signal generation means 30. The reference signal generation means 30 has 120-degree advance signal calculation means 31, 120-degree delay signal calculation means 32, reference voltage signal calculation means 33, reference cosine signal wave calculation means 34, and reference sine wave signal calculation means 35.

The 120-degree advance signal calculation means 31 generates a signal with a phase advanced by 120 degrees from the V-phase fundamental wave signal Vvrefbase, that is, a signal in phase with the U-phase fundamental wave signal Vurefbase. The signal with a phase advanced by 120 degrees from the V-phase fundamental wave signal Vvrefbase can be calculated, for example, by subtracting a signal obtained by multiplying a signal with a phase advanced by 90 degrees from the fundamental wave signal Vvrefbase by a coefficient √3/2, from a signal obtained by multiplying the fundamental wave signal Vvrefbase by a coefficient −1/2. The signal with a phase advanced by 90 degrees from the fundamental wave signal Vvrefbase can be obtained, for example, by multiplying a signal obtained by calculating the moving average of the fundamental wave signal Vvrefbase, by a coefficient π/2.

The 120-degree delay signal calculation means 32 generates a signal with a phase delayed by 120 degrees from the W-phase fundamental wave signal Vwrefbase, that is, a signal in phase with the U-phase fundamental wave signal Vurefbase. The signal with a phase delayed by 120 degrees from the W-phase fundamental wave signal Vwrefbase can be calculated, for example, by adding a signal obtained by multiplying a signal with a phase advanced by 90 degrees from the fundamental wave signal Vwrefbase by a coefficient √3/2, to a signal obtained by multiplying the fundamental wave signal Vwrefbase by a coefficient -1/2. The signal with a phase advanced by 90 degrees from the fundamental wave signal Vwrefbase can be obtained, for example, by multiplying a signal obtained by calculating the moving average of the fundamental wave signal Vwrefbase, by a coefficient π/2.

The reference voltage signal calculation means 33 adds the U-phase fundamental wave signal Vurefbase and each of the signals generated by the 120-degree advance signal calculation means 31 and the 120-degree delay signal calculation means 32, and then multiplies the result of the addition by ⅓, thus generating a reference voltage signal Vref.

When the three-phase voltages of the power grid are in equilibrium, the reference voltage signal Vref generated by the reference voltage signal calculation means 33 is a signal in phase with the U-phase fundamental wave signal Vurefbase and having the same amplitude value. Meanwhile, if a short circuit occurs between two phases in the power grid, the reference voltage signal Vref generated by the reference voltage signal calculation means 33 is a signal in phase with the fundamental wave signal where no short circuit occurs, and having ½ of the amplitude value.

The reference cosine wave signal calculation means 34 takes the reference voltage signal Vref from the reference voltage signal calculation means 33 as input, and generates a reference cosine wave signal cos ωt. The reference cosine wave signal cos ωt is a signal in phase with the reference voltage signal Vref and having an amplitude value standardized to 1.

The reference cosine wave signal cos ωt can be obtained, for example, by dividing the reference voltage signal Vref by its amplitude value. The amplitude value of the reference voltage signal Vref can be obtained, for example, by eliminating a double frequency component of the reference voltage signal Vref from an absolute value signal of the reference voltage signal Vref. The double frequency component of the reference voltage signal Vref can be eliminated by using moving average calculation, a band elimination filter, a low-pass filter or the like.

The reference sine wave signal calculation means 35 takes the reference cosine wave signal cos ωt from the reference cosine wave signal calculation means 34 as input, and generates a reference sine wave signal sin ωt with a phase advanced by 90 degrees from the reference cosine wave signal cos ωt. The reference sine wave signal sin ωt can be obtained, for example, by multiplying the moving average value of the reference cosine wave signal cos ωt by a coefficient −π/2.

Also, while the reference voltage signal calculation means 33 of the reference signal generation means 30 uses the U-phase fundamental wave signal Vurefbase as a reference in FIG. 4, the V-phase fundamental wave signal Vvrefbase or the W-phase fundamental wave signal Vwrefbase may be used as a reference to calculate the reference voltage signal Vref.

The reference signal generation means 30 outputs the calculated reference cosine wave signal cos ωt and reference sine wave signal sin ωt to the coordinate conversion means 14. The coordinate conversion means 14 performs coordinate conversion of the active current command Idref and the reactive current command Iqref using the reference cosine wave signal cos ωt and the reference sine wave signal sin ωt, and thus generates a U-phase output current command Iuref and a W-phase output current command Iwref.

The operation of the output current control means 15 taking the output current command Iuref and the W-phase output current command Iwref as input is the same as in the case of the conventional distributed power supply system described with reference to FIG. 6.

Also, the reference signal generation means 30 outputs the calculated reference cosine wave signal cos ωt to the third harmonic signal generation means 40.

The third harmonic signal generation means 40 takes the fundamental wave signals Vurefbase, Vvrefbase, Vwrefbase and the reference cosine wave signal cos ωt as input, and generates a third harmonic signal V3ref. FIG. 5 is a block diagram showing an example of the third harmonic signal generation means 40. The third harmonic signal generation means 40 has triple harmonic signal calculation means 41, amplitude calculation means 42, and a multiplier 43.

The triple harmonic signal calculation means 41 calculates a triple harmonic signal cos 3ωt with respect to the reference cosine wave signal cos ωt. For example, according to the following equation (3), the triple harmonic signal cos 3ωt with respect to the reference cosine wave signal cos ωt can be calculated.

[Math. 2]

$$\cos 3\alpha = 4\cos^3\alpha - 3\cos\alpha \quad (3)$$

Also, the triple harmonic signal cos 3ωt may be generated by calculating data by tripling the phase data of the reference cosine wave signal cos ωt and then reading out the value of a cosine wave signal corresponding to the phase data from a table that stores the value in advance, based on the phase data.

The amplitude calculation means 42 calculates an amplitude value V3amp of the third harmonic signal, using the fundamental wave signals Vurefbase, Vvrefbase, Vwrefbase. For example, the amplitude value can be obtained by eliminating a sextuple frequency component from a signal resulting from adding absolute value signals of the individual fundamental wave signals Vurefbase, Vvrefbase, Vwrefbase and then multiplying the result by a predetermined coefficient. The sextuple frequency component can be eliminated by using moving average calculation, a band elimination filter, a low-pass filter or the like.

The multiplier 43 multiplies the triple harmonic signal cos 3ωt by the amplitude value V3amp of the third harmonic signal and thus generates a third harmonic signal V3ref. The third harmonic signal V3ref is outputted from the third harmonic signal generation means 40 to the three-phase voltage command signal generation means 50.

The three-phase voltage command signal generation means 50 adds the third harmonic signal V3ref to each of the fundamental wave signals of three phases Vurefbase, Vvrefbase, Vwrefbase, and thus generates voltage command signals Vuref, Vvref, Vwref of the respective phases. The voltage command signals Vuref, Vvref, Vwref of the respective phases are in the shape of trapezoidal waves. The voltage command signals Vuref, Vvref, Vwref of the respective phases are outputted from the three-phase voltage command signal generation means 50 to the gate signal generation circuit 16.

The gate signal generation circuit 16 adds the voltage command signals Vuref, Vvref, Vwref of the respective phases to correction signals ΔVuref, ΔVvref, ΔVwref with respect to the voltage commands of the respective phases, by each phase, and thus generates modulation signals of the respective phases. Next, the gate signal generation circuit 16 compares the size of the modulation signal of each phase with a predetermined carrier signal and generates PWM-modulated control signals G1 to G6. The control signals G1 to G6 are outputted to the inverter circuit 10.

The semiconductor switching elements of the inverter circuit 10 have their on/off state controlled, based on the control signals G1 to G6 generated by the gate signal generation circuit 16. Consequently, AC voltages of three phases are generated at the output end of the inverter circuit 10.

In the above embodiment, the three-phase AC voltages are output from the inverter circuit 10 can quickly follow changes in the voltage of each phase in the power grid, with the function of the control circuit 101. Consequently, even if an instantaneous voltage sags in the power grid, the generation of an overcurrent is prevented.

Also, the semiconductor switching elements Q1 to Q6 of the inverter circuit 10 have their on/off state controlled, based on the trapezoidal-modulated control signals G1 to G6. Consequently, the inverter circuit 10 can effectively utilize the output voltage of the DC power supply 11. That is, compared with the case where sine wave modulation is carried out, the inverter circuit 10 can output a desired AC voltage even in an area where the generation voltage of a solar cell or the like is lower.

Also, the common third harmonic signal V3ref is included in the voltage command signals Vuref, Vvref, Vwref of the respective phases. Therefore, a voltage generated between lines at the AC output end of the inverter circuit 10 includes no voltage component resulting from the third harmonic signal V3ref. Thus, the capacitor 8 and the reactor 9 for eliminating a harmonic component from the output voltage from the inverter circuit 10 need not be large-size.

Moreover, if an instantaneous short circuit occurs between two phases in the power grid of the three-phase AC power supply 1, the inverter circuit 10 can use the output voltage of the phase that is not involved in the short circuit, and can output the trapezoidal-modulated voltage. In this case, the inverter circuit 10 does not generate a zero-phase voltage.

As described above, according to this embodiment, a distributed power supply system which can stably supply power to the power grid even if an instantaneous voltage sags in the power grid can be happened.

REFERENCE SIGNS LIST three-phase AC power supply, 2, 3, 4 ... switch, 5 ... load, 6 ... voltage detector, 7 ... current detector, 8 ... capacitor, 9 ... reactor, 10 ... inverter circuit, 11 ... DC power supply, 12 ... PLL calculation means, 13, 50 ... three-phase voltage command signal generation means, 14 ... coordinate conversion means, 15 ... output current control means, 16 ... gate signal generation circuit, 20 ... three-phase fundamental wave signal generation means, 21 ... band-pass filter, 22 ... phase adjustment means, 23 ... adder, 30 ... reference signal generation means, 31 ... 120-degree advance signal calculation means, 32 ... 120-degree delay signal calculation means, 33 ... reference voltage signal calculation means, 34 ... reference cosine wave signal calculation means, 35 ... reference sine wave signal calculation means, 40 ... third harmonic signal generation means, 41 ... triple harmonic signal calculation means, 42 ... third harmonic amplitude calculation means, 43 ... multiplier, 100, 101 ... control circuit, 121 ... αβconversion means, 122 ... dq conversion means, 123 ... proportional-integral control means, 124 ... VCO means, 125, 126 ... adder, 221 ... low-pass filter, 222, 224 ... multiplier, 223 ... adder.

The invention claimed is:

1. A distributed power supply system, comprising:
an inverter circuit having semiconductor switching elements connected in a three-phase bridge; and
a control circuit which compares a predetermined carrier signal with voltage command signals of three phases and generates a control signal to control the semiconductor switching elements, wherein the distributed power supply system supplies AC power obtained by converting DC power to a power grid of a three-phase AC power supply,
wherein the distributed power supply system has a voltage detector which detects a grid voltage of the three-phase AC power supply,
wherein the control circuit has:
three-phase fundamental wave signal generation means which generates a first fundamental wave signal, a second fundamental wave signal, and a third fundamental wave signal from the grid voltage detected by the voltage detector;
reference signal generation means which generates a first reference signal in phase with the first fundamental wave signal, based on the first to third fundamental wave signals;
third harmonic signal generation means which generates a third harmonic signal, using a triple harmonic signal generated based on the first reference signal, and the first to third fundamental wave signals outputted from the three-phase fundamental wave signal generation means; and
three-phase voltage command signal generation means which adds each of the first to third fundamental wave signals to each of the third harmonic signal and thus generates voltage command signals of three phases,
and wherein the reference signal generation means has:
first phase adjustment means which adjusts the phase of the second fundamental wave signal and thus generates a fourth fundamental wave signal in phase with the first fundamental wave signal;
second phase adjustment means which adjusts the phase of the third fundamental wave signal and thus generates a fifth fundamental wave signal in phase with the first fundamental wave signal;
reference voltage signal generation means which adds the first fundamental wave signal, the fourth fundamental wave signal, and the fifth fundamental wave signal and thus generates a reference voltage signal;
first reference signal generation means which generates a first reference signal being in phase with the reference voltage signal and having an amplitude standardized to a predetermined value; and
second reference signal generation means which generates a second reference signal having a phase difference of 90 degrees from the first reference signal.

2. The distributed power supply system according to claim 1,
wherein a filter circuit is provided between the three-phase AC power supply and the inverter circuit, and
wherein the three-phase fundamental wave signal generation means has:
fundamental wave component extraction means which extracts a fundamental wave component signal from the grid voltage detected by the voltage detector; and
phase adjustment means which adds a predetermined phase value to the extracted fundamental wave component signal and thus generates the first to third fundamental wave signals.

3. The distributed power supply system according to claim 2, wherein the phase value added to the extracted fundamental wave component signal is an amount of phase difference generated between input and output voltage of the filter circuit.

* * * * *